(12) United States Patent
Shukla et al.

(10) Patent No.: US 10,949,176 B2
(45) Date of Patent: Mar. 16, 2021

(54) AUTOMATIC VIEW GENERATION BASED ON ANNOTATIONS

(71) Applicant: SAP SE, Walldorf (DE)

(72) Inventors: Priyanshu Shukla, Leimen (DE); Rahul Choudhary, Bangalore (IN)

(73) Assignee: SAP SE, Walldorf (DE)

( * ) Notice: Subject to any disclaimer, the term of this patent is extended or adjusted under 35 U.S.C. 154(b) by 1 day.

(21) Appl. No.: 16/420,865

(22) Filed: May 23, 2019

(65) Prior Publication Data

US 2020/0371757 A1 Nov. 26, 2020

(51) Int. Cl.
*G06F 8/38* (2018.01)
*G06F 16/907* (2019.01)
*G06F 9/451* (2018.01)
*G06F 40/14* (2020.01)

(52) U.S. Cl.
CPC .............. *G06F 8/38* (2013.01); *G06F 9/451* (2018.02); *G06F 16/907* (2019.01); *G06F 40/14* (2020.01)

(58) Field of Classification Search
CPC .......... G06F 8/38; G06F 9/451; G06F 16/907; G06F 40/14
See application file for complete search history.

(56) References Cited

U.S. PATENT DOCUMENTS

| | | | | |
|---|---|---|---|---|
| 2010/0153432 | A1* | 6/2010 | Pfeifer | G06F 16/289 707/769 |
| 2016/0092499 | A1* | 3/2016 | Leigh | G06F 8/34 707/740 |
| 2017/0031983 | A1* | 2/2017 | Sarferaz | G06F 16/24535 |
| 2018/0004543 | A1* | 1/2018 | Grammatikakis | G06F 8/38 |
| 2019/0188297 | A1* | 6/2019 | Goyal | G06F 9/451 |
| 2019/0332230 | A1* | 10/2019 | Gueco | H04L 41/0823 |

* cited by examiner

*Primary Examiner* — Tadesse Hailu
(74) *Attorney, Agent, or Firm* — Fish & Richardson P.C.

(57) ABSTRACT

The present disclosure involves systems, software, and computer implemented methods for automatic view generation based on annotations. One example method includes receiving a request to display a user interface view on a client device. Metadata that defines at least one entity included in at least one data source is received. Annotations that define user interface elements for displaying information for the at least one entity are received. A metamodel is generated using the received metadata and the received annotations. Native user interface elements are automatically generated using the metamodel. The native user interface elements are native to the client device. The native user interface elements in the user interface view on the client device.

20 Claims, 11 Drawing Sheets

AUTOMATIC VIEW GENERATION BASED ON ANNOTATIONS

TECHNICAL FIELD

The present disclosure relates to computer-implemented methods, software, and systems for automatic view generation based on annotations.

BACKGROUND

Model View Controller (MVC) is a pattern that can be used for user-interface based applications by dividing an application into three interconnected parts. The pattern allows for separation of internal representations of data from presentation of data. A model component represents an application's dynamic data structure that is independent of the user interface. The model can be used for managing data, logic and rules of the application. A view component can be used for presentation of information such as a chart, diagram, table, or other type of interface. Multiple views of the same information can be presented. A controller component accepts user input and converts the user input to commands for the model component or the view component.

In many mobile application deployment scenarios, the mobile application designer develops the mobile application using principles such as MVC. Once designed and tested, the application is deployed to end users. At this stage, the application is locked in that changes to the application can be done by either transmitting updates to mobile device (e.g., sections of code are physically or logically replaced with updated sections of code) or an entire new application is transmitted to replace the original application. This creates a latency in providing updated applications or features in applications to end users in that updates are usually only done on an occasional basis. In situations where updates are provided on a scheduled basis, the end user may use a lesser desirable application for a longer period of time. In turn, some end users may swap over to a different mobile application from a different provider to be able to use a mobile application with more enhanced capabilities.

SUMMARY

The present disclosure involves systems, software, and computer implemented methods for automatic view generation based on annotations. One example method includes receiving a request to display a user interface view on a client device. Metadata that defines at least one entity included in at least one data source is received. Annotations that define user interface elements for displaying information for the at least one entity are received. A metamodel is generated using the received metadata and the received annotations. Native user interface elements are automatically generated using the metamodel. The native user interface elements are native to the client device. The native user interface elements in the user interface view on the client device.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1A:
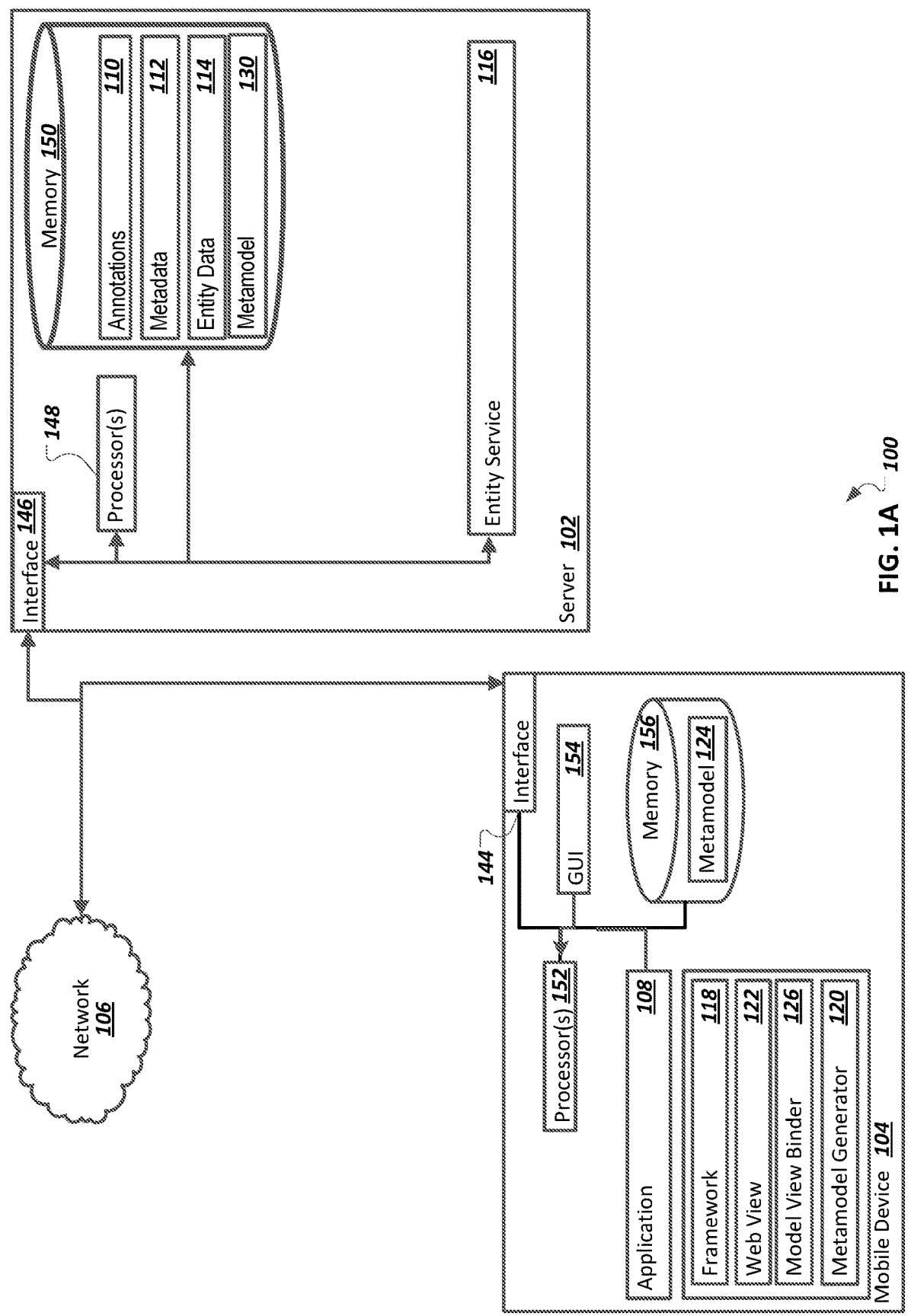
FIG. 1A is a block diagram illustrating an example system for automatic client-side view generation based on annotations.

Mobile application development can be time consuming, and deploying an application can involve multiple steps for both developers and users. A developer may need to rebuild an application, deploy the application, such as to an application store, notify users of an upgraded version, or perform other actions. A user may need to be made aware that a new version exists, go to an application store, and download the application. Web-based applications can solve some of these issues but can suffer from performance issues, as compared to native applications that use native user interface elements specific to a particular platform.

To solve problems of performance and maintenance/upgrade issues, native view generation and lifecycle management for applications can be centralized and offered as a framework. A framework can include, for example, one or more of a library that can be linked to an application, an API (Application Programming Interface), or one or more server components). Using the framework, application developers can have native views (e.g., views that use native user interface elements rather than web-based elements) for applications generated by the framework by supplying annotations. Annotations can be defined in a document and can include information about view and other extended entity relationships that are not present in metadata that is included in a separate metadata document. The metadata document can include information about entities, types, and properties that are exposed by a respective service. Using the framework, application developers can have native views created based on a combination of metadata and annotations. The metadata can be OData metadata and the annotations can be OData annotations, for example. Other types of metadata and annotations can be used.

A consumable framework can be easily imported into a mobile application and consumed with a very negligible effort by application developers. Application views can have an independent lifecycle which can be managed by the framework. The framework can process the service metadata and annotations to determine placement of content within defined floorplans and to create a consumable view object for the application. An application developer can write code to have this generated view embedded in an application. An annotation document can also be processed by the framework to bind the view to data obtained from service calls.

View configurations can be server-based. A configuration change can be made on the server by changing an annotation, for example. An application that uses a view can receive an updated view the next time the application is loaded. Accordingly, applications can be adaptable to server configuration changes.

Other approaches can use a web view to achieve a synchronized view across different mobile clients. However, using a web view can involve significant client processing time. Using server-based views can result in applications being loaded more quickly as compared to being presented in a web view, as using a web view can involve downloading and initializing a web view component on the mobile device.

To create a specific view for an application based on a pre-generated view, a developer can create or modify annotations. Applications can be built using a web service. The web service can include annotations which are extra declarations on top of the service. To adapt a pregenerated view, annotations can be modified on the service.

An example view can be a view for a main object. For instance, an example main object can be a product. The view can have a title element, which can be, for example, a product name. The view can have a subtitle element, which can be, for example, a product price. The view can include additional information which can be displayed in a list or table format. For instance, supplier availability can be shown underneath the product name and product price elements.

Using the annotation-based approach, developers can use views that have been developed as a common floorplan that provides a common structure that can be used by multiple applications. Developers can use annotations to specify which data is to be inserted into predefined portions of an application, for example. In some implementations, developers can also customize common views (common to multiple applications) for a particular application, to, for example, to display additional properties of an object. The common view can serve as a base, which can be easily modified with additional annotation(s), to display additional fields, for example.

A developer may want to customize the view for a particular application. For instance, rather than a product price, the developer may want the application to display a product identifier or a product quantity. To modify the application, the developer can change a service definition by changing an annotation to specify that the title property is no longer a product price but a product quantity, for example. Definitions may be established in a variety of ways such as, for example, using the OData protocol. The next time the application loads for a user, the view can display the product quantity rather than the product price. The developer does not need to redeploy the application (to an application store, for example). Other approaches can involve rebuilding an application, perhaps multiple times for multiple platforms, and redeploying the application (perhaps to multiple application stores). Annotation-based approaches do not require rebuilding or redeploying the application. Additionally, application users do not need to re-download the application.

A metalayer that is between the web service and other server logic can read the annotations for particular view elements. For instance, a property that is annotated as a title property can result in a corresponding property value being placed in a particular location within the view that is configured as a title area. Similarly, a property that is annotated as a subtitle property can result in a corresponding property value being placed in another location within the view that is configured as a subtitle area.

For example, an application developer who is developing a banking application that uses a view that displays a financial object may configure annotations to display first and second properties of the financial object as a title and a subtitle, respectively, whereas another developer who is developing a procurement application may use a same view but may customize the view so that different, third and fourth properties of the business object are displayed as a title and subtitle, respectively. Neither developer needs to write custom native application code to make use of the view. In some implementations, certain properties of a view can be hidden dynamically based on if a user has permission to access a certain property. For example, a procurement manager can see a sales quotation table but a sales representative may not, on a same view.

If manually writing logic for a view natively, a developer has to write code to natively define what, for example, a label, or a table references in the backend. However, with annotations, simply changing an annotation can dynamically change bindings.

Use of annotations can result in easier and more efficient development, as compared to writing native code. Other advantages can include generation of consistent views across different native platforms, better performance as compared to web-based view loading, native user experience for users, reduction of design and programming efforts, and leverage of existing web development component.

In some implementations, the framework can provide smart templates as a central service. Smart templates can involve bundling annotations, metadata and associated controllers into a reusable template. Use of templates can solve maintenance and redundant effort issues described herein.

For instance, when different applications are developed, similar work and coding can be repeated by mobile application developers. These separately developed views can be problematic to update, such as if an organization wants to deploy a design-related change to all views. Enterprise mobile application developers often re-invent the wheel for each new mobile application or platform. For instance, application developers may spend time and development effort writing view, controller, and other glue code for each view in an application. To build a defined floorplan view in a mobile application, an application developer can write code to handle different aspects of mobile application development, including lifecycle management (e.g., error handling, translation), using native coding language(s). For instance, application developers for each application can create view files, write code to handle network calls, event handling, and addressing other aspects of the Model View Controller pattern.

In enterprise mobile offerings, there are often views which are standard or similar across different mobile applications. For instance, in an enterprise scenario, with user experience guidelines, there may be common view patterns that are common across different applications for consistency. When application developers develop each application individually, repeated effort by every application development team can result, from repeated writing of the same or similar code.

In addition to repeated efforts at development time, efforts can be repeated in maintenance phases, since issues may need to be fixed in similar places in multiple applications. Each time there is an upgrade in an operating system version or a change in a user experience specification, application developers may be required to update application code for applications to be consistent and compatible with upgrades or changes. For instance, if user experience guidelines change, each team may spend reductant effort to upgrade applications to be compatible with the new guidelines. Another challenge for application developers is to constantly update mobile applications to be compatible with upgrades of operating system software updates. Redundant maintenance effort can be performed by application development teams to keep pace with environmental changes, with the redundant efforts multiplied by different teams working on different mobile offerings.

Using templates, multiple developers can reuse common views that can be common among multiple applications. Additionally, all applications that use a common view can obtain updates to the view if a view configuration is centrally changed. For example, design guidelines that affect multiple applications may change. Changes can be made to the centralized views to be in compliance with the new design guidelines. Each application can receive the update automatically, without having to be redeveloped individually to get new design features.

FIG. 1A is a block diagram illustrating an example system 100 for automatic client-side view generation based on annotations. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system or server may be provided by multiple systems or servers.

An application 108 is running on the client device 104. User interface views for the application 108 can be generated, on the client device 104, based on annotations 110 and metadata 112 stored on the server 102. Views can also be based on view resources, such as images (e.g., logos), audio or video files, etc. Metadata and/or annotations can define whether resources are stored locally or to be retrieved from a server. Metadata and/or annotations can also specify how resources are to be displayed. The metadata 112 can be OData metadata that describes entity data 114 for various entities that can be provided by an entity service 116, for example. The annotations 110 can be OData annotations.

A framework 118 can reside on the client device 104. In some implementations, the framework 118 is a library that is bundled with the application 108. In response to a request to initialize a view of the application 108, the framework 118 can send a request to a metamodel generator 120 to generate a metamodel based on annotations and metadata. The view can be configured to refer to annotations 110 and metadata 112, for example (or to server URLs that are associated with the annotations 110 and metadata 112, respectively). In some implementations, the metamodel generator 120 is embedded within a web view 122 that resides on the client device 104.

The metamodel generator 120 can request and receive the annotations 110 and the metadata 114 (e.g., from the server 104, the framework 118, or a proxy server (not shown)). The metamodel generator 120 can generate a metamodel 124 that is a merging of the annotations 110 and the metadata 112 and that is a blueprint for a requested view. The framework 118 can receive the metamodel 124 and can use the metamodel 124 to identify view elements and resources. Resources can be retrieved, e.g., locally and/or from resource providing server(s). The framework 118 can use a model view binder 126 to generate native user interface elements based on the metamodel 124. The native user interface elements can be rendered in the application 108, in the requested view.

The web view 122 can be used to display non-native user interface elements (e.g., based on the annotations 110 and/or the metadata 112 or based on other code (e.g., HTML (HyperText Markup Language). However, generating the native user interface elements based on the metamodel 124 provides several advantages versus using the web view 122 for display of non-native user interface elements. Generating and displaying native user interface elements can generally be performed faster than generation and display of user interfaces within the web view 122. Additionally, users can benefit from having the application 108 being presented with a native look and feel. Developers can leverage native user interface elements by using features that are not available in web-based, non-native elements. Other advantages and features are discussed below.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 124 and 126 are used by the client device 104 and the server 102, respectively, for communicating with other systems in a distributed environment—including within the system 100—connected to the network 106. Generally, the interfaces 124 and 126 each comprise logic encoded in software and/or hardware in a suitable combination and operable to communicate with the network 106. More specifically, the interfaces 124 and 126 may each comprise software supporting one or more communication protocols associated with communications such that the network 106 or interface's hardware is operable to communicate physical signals within and outside of the illustrated system 100.

The server 102 includes one or more processors 148. Each processor 148 may be a central processing unit (CPU), a blade, an application specific integrated circuit (ASIC), a field-programmable gate array (FPGA), or another suitable component. Generally, each processor 148 executes instructions and manipulates data to perform the operations of the server 102. Specifically, each processor 148 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 150. In some implementations, the server 102 includes multiple memories. The memory 150 may include any type of memory or database module and may take the form of volatile and/or non-volatile memory including, without limitation, magnetic media, optical media, random access memory (RAM), read-only memory (ROM), removable media, or any other suitable local or remote memory component. The memory 150 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the application 108. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 152. Each processor 152 included in the client device 104 may be a central processing unit (CPU), an application specific integrated circuit (ASIC), a field-programmable gate array (FPGA), or another suitable component. Generally, each processor 152 included in the client device 104 executes instructions and manipulates data to perform the operations of the client device 104. Specifically, each processor 152 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 154.

The GUI 154 of the client device 104 interfaces with at least a portion of the system 100 for any suitable purpose, including generating a visual representation of the modeling application 108. In particular, the GUI 154 may be used to view and navigate various Web pages, or other user interfaces. Generally, the GUI 154 provides the user with an efficient and user-friendly presentation of business data provided by or communicated within the system. The GUI 154 may comprise a plurality of customizable frames or views having interactive fields, pull-down lists, and buttons operated by the user. The GUI 154 contemplates any suitable graphical user interface, such as a combination of a generic web browser, intelligent engine, and command line interface (CLI) that processes information and efficiently presents the results to the user visually.

Memory 156 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 156 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

In some implementations, a metamodel and a view is created on a server, rather than on a client, for pricing and/or performance reasons, as described in more detail below. A server-side approach may be more server resource intensive, and may thus cost more, but may offload client processing to the server. Application developers can choose a best approach that meets performance/cost concerns.

Figure 1B:
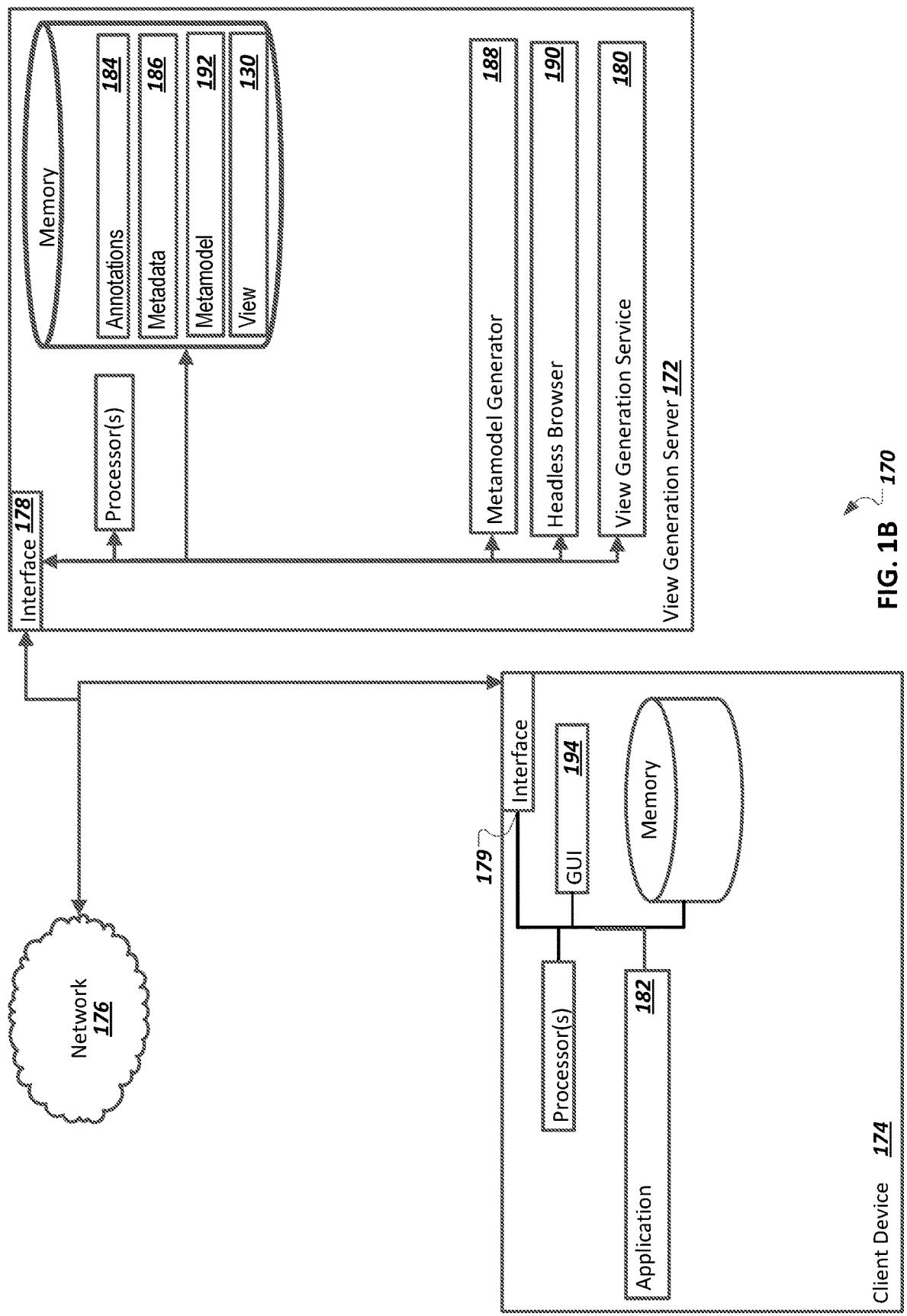
FIG. 1B is a block diagram illustrating an example system for automatic server-side view generation based on annotations.

FIG. 1B is a block diagram illustrating an example system 170 for automatic server-side view generation based on annotations. The illustrated system 170 includes or is communicably coupled with a view generation server 172, a client device 174, and a network 176. The view generation server 172 and the client device 174 can communicate over the network 176 using interfaces 178 and 179, respectively.

Although shown separately, in some implementations, functionality of two or more systems or servers may be provided by a single system or server. In some implementations, the functionality of one illustrated system or server may be provided by multiple systems or servers.

The view generation server 172 provides a view generation service 180 that can generate a view for a requesting client, based on annotations and metadata. For instance, an application 182 is running on the client device 174. The application 182 can send a request to the view generation server 172 for creation of a view. The request can include metadata and annotations for the view, or can include URLs that specify locations of metadata and annotations for the view. The application 182 may have previously received metadata and annotations for the view from another server, for example. If the request includes URLs, the view generation server 172 can retrieve annotations and metadata using the URLs. The view generation server 172 can store received or retrieved annotations and metadata as annotations 184 and metadata 186.

A metamodel generator 188 can use a headless browser 190 to generate a metamodel 192, based on the annotations 184 and the metadata 186. In some implementations, the metamodel 192 is provided in response to the request sent by the client device 174. The client device 174 can use the received metamodel to generate a view for presentation on a GUI 194 of the client device 174. In some implementations, the metamodel generator 188 formats the metamodel 192 as a JSON (JavaScript Object Notation) response that can be sent to and used by the client device 174 for a client-side view.

Figure 2:
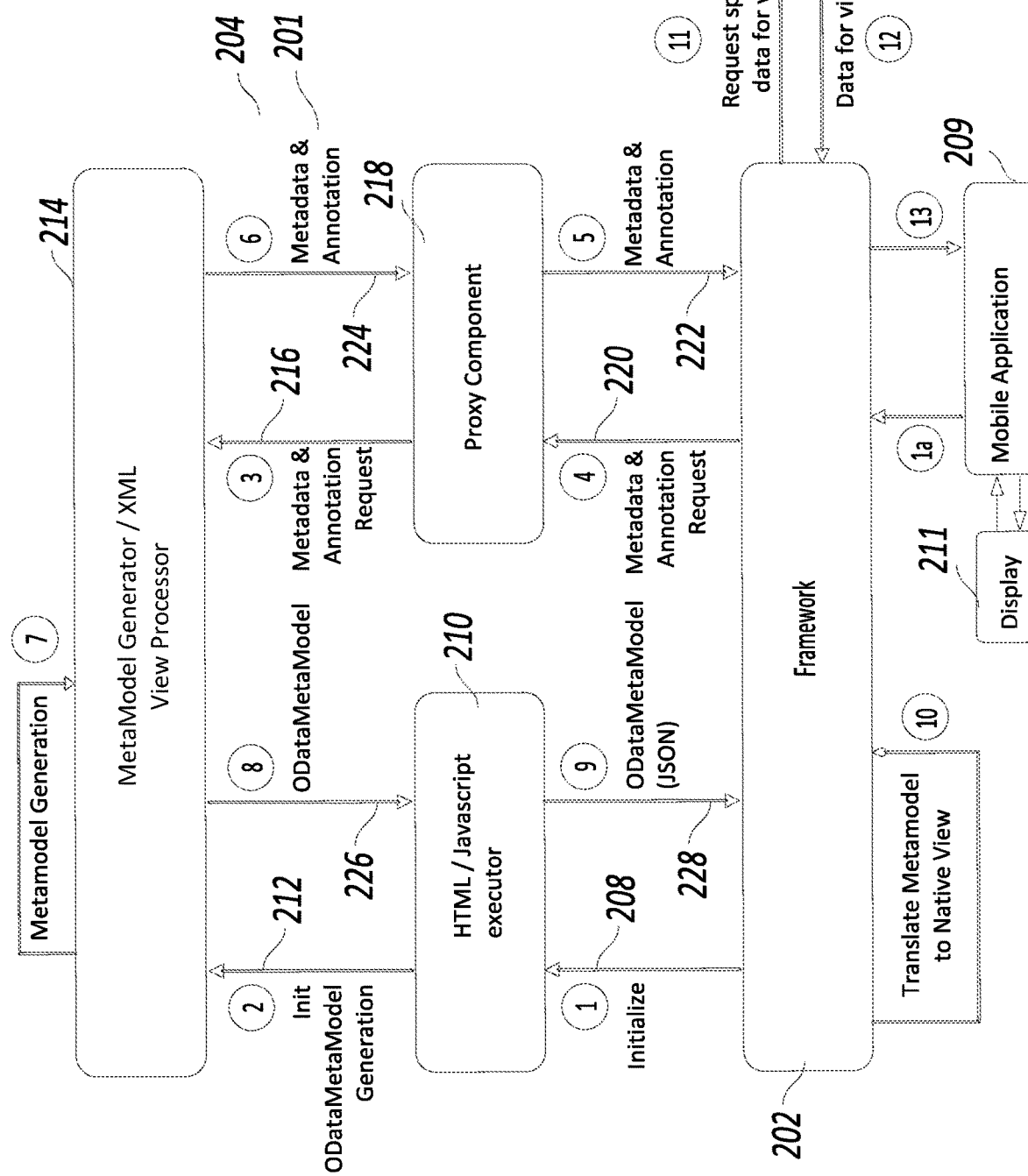
FIG. 2 is a block diagram of an example client-side system for view generation using metamodel generation components 201.

FIG. 2 is a block diagram of an example client-side system 200 for view generation using metamodel generation components 201. A framework 202 resides on a mobile device 204. The mobile device 204 is in communication with a server 206. In summary, the mobile device 204, using the framework 202, can request and receive a service definition from the server 206, generate a view, and make other calls to the server 206 for data to populate the generated view. A service definition for a service includes information for how to interact with the service, including message formats, transport protocols, and a service location. View generation can occur on the mobile device 204 but what to display in the view can be defined, usually in part by, server-based configurations on the server 206. The framework 202 can be a library that can be bundled with and linked to a mobile application. The framework 202 can be configured for a particular type of device and/or operating system (e.g., the framework 202 can be configured for use on a currently running operating system on the mobile device 204).

In a first stage (e.g., a circled "one"), the framework 202 sends a view initialize request 208 to a HTML/JavaScript executor 210 to create a dynamic view. The dynamic view can include, for example, when fully generated, server-based data. Some dynamic views can be based, in part, on locally-stored data. The view initialize request 208 can be sent in response to a trigger in a mobile application 209, such as an initial application load or a user input that represents a request to see a view (e.g., a user input entered on a display 211 and provided to the framework 202 is shown as a stage "1a"). The view that is being requested can be identified by a view configuration that has been generated in the framework 202. The view configuration can refer to a service URL (Uniform Resource Locator), for example. Configurations can reside in the framework 202 for all views of an application, and each configuration can refer to a backend service, for example. In some implementations, the HTML/JavaScript executor 210 can be a hidden web view component that is running in the background on the mobile device 204. In some implementations, other instances of a web view can be used on the mobile device 204 for other purposes, such as for displaying web-based user interfaces.

In a second stage, the HTML/JavaScript executor 210 sends a metamodel generation request 212 to a metamodel generator/XML (eXtensible Markup Language) view processor 214. The metamodel generator/XML view processor 214 can be running in (e.g., loaded in) or otherwise associated with the HTML/JavaScript executor 210. The metamodel generation request 212 is a request to generate a metamodel that is a merging of metadata and annotations. Metadata, which can be, for example, OData metadata, can include information about entities, types, properties and entity relationships, as exposed by a respective service. An entity can describe an object, such as a business object (e.g., a product, sales order, or other type of object). Annotations, which can be, for example, OData annotations, can include information about views and other extended relationships that are not present in the metadata. The metadata and/or the annotations can be an XML document, for example. The metamodel generation request 212 can include URLs for the annotations and the metadata that are to be used to generate the metamodel.

In a third stage, the metamodel generator/XML view processor 214 sends a metadata and annotation request 216 to a proxy component 218. The proxy component 218 can be used to ensure that malicious scripting code is not injected from network sources or within a metadata or annotation payload. The metadata and annotation request 216 is for metadata exposed by a service, and associated annotations. The metadata and annotations are not local to the client device and are thus requested from a server used to provide the service. In a fourth stage, the proxy component 218 sends a metadata and annotation request 220 (which can be a forwarding of the metadata and annotation request 216) to the framework 202. The framework 202 can send a metadata and annotation request to the server 206 or can retrieve previously received metadata and annotations. In some implementations, a call to the proxy component 218 results in a request being sent to a mock server (not shown). Although shown as a single request, in some implementations, metadata and annotations are requested from and received by different servers. The metadata and annotation request can be a request for a service definition, with metadata and annotations. The service definition with annotations can describe a list of properties and a structure of the requested view (e.g., what property values should go in which places in the view).

In a fifth stage, the framework 202 sends received (or retrieved) metadata and annotations 222 to the proxy component 218. As mentioned, the proxy component 218 can ensure that malicious scripting code is not injected into the metadata and annotations 222. In a sixth stage, the proxy component 218 sends metadata and annotations 224 to the metamodel generator/XML view processor 214.

In a seventh stage, the metamodel generator/XML view processor 214 uses the metadata and annotations 224 to create a metamodel. The metamodel is a blueprint of the requested view. The metamodel can include information about the view and information about relationships of properties associated with the view. The metamodel can be, for example, a JSON (JavaScript Object Notation) structure. The metamodel generator/XML view processor 214 can be configured to generate (in response to other requests) metamodels for web-based applications as well as for a native view that is to be generated by the mobile platform for the current request. The framework 202 can leverage a hidden web view, with the loaded metamodel generator/XML view processor 214, to generate the metamodel, rather than having metamodel generation logic included directly in the framework 202 (and other mobile platforms for other environments).

In an eighth stage, the metamodel generator/XML view processor 214 sends a generated metamodel 226 to the HTML/JavaScript executor 210 (although, in some implementations, the metamodel/XML view processor 214 sends the metamodel 226 directly to the framework 202). In a ninth stage, the HTML/JavaScript executor 210 sends a metamodel 228 to the framework 202.

In a tenth stage, the framework 202 translates the metamodel 228 to native user interface elements, to generate a native view, and renders the native view. The framework 202 can, for example, perform view model binding to map scripting elements in rhw metamodel 228 to native user interface elements. The framework 202 can include a user interface vocabulary mapping, for example. The user interface vocabulary mapping can map user interface annotations to respective platform-specific user interface elements. For instance, a table annotation can be mapped to an iOS® UITableView native element on an iOS @ platform.

In an eleventh stage, the framework 202 sends a request 230 to the server 206 for specific property value data to populate the generated view. In a twelfth stage, the framework 202 receives requested property value data 232 and displays the property value data in the rendered view. The property value data can include actual property values from one or more data sources which are then displayed, in a thirteenth stage, in the mobile application 209, on the display 211, in configured places, within the view, on the mobile device 204.

Figure 3:
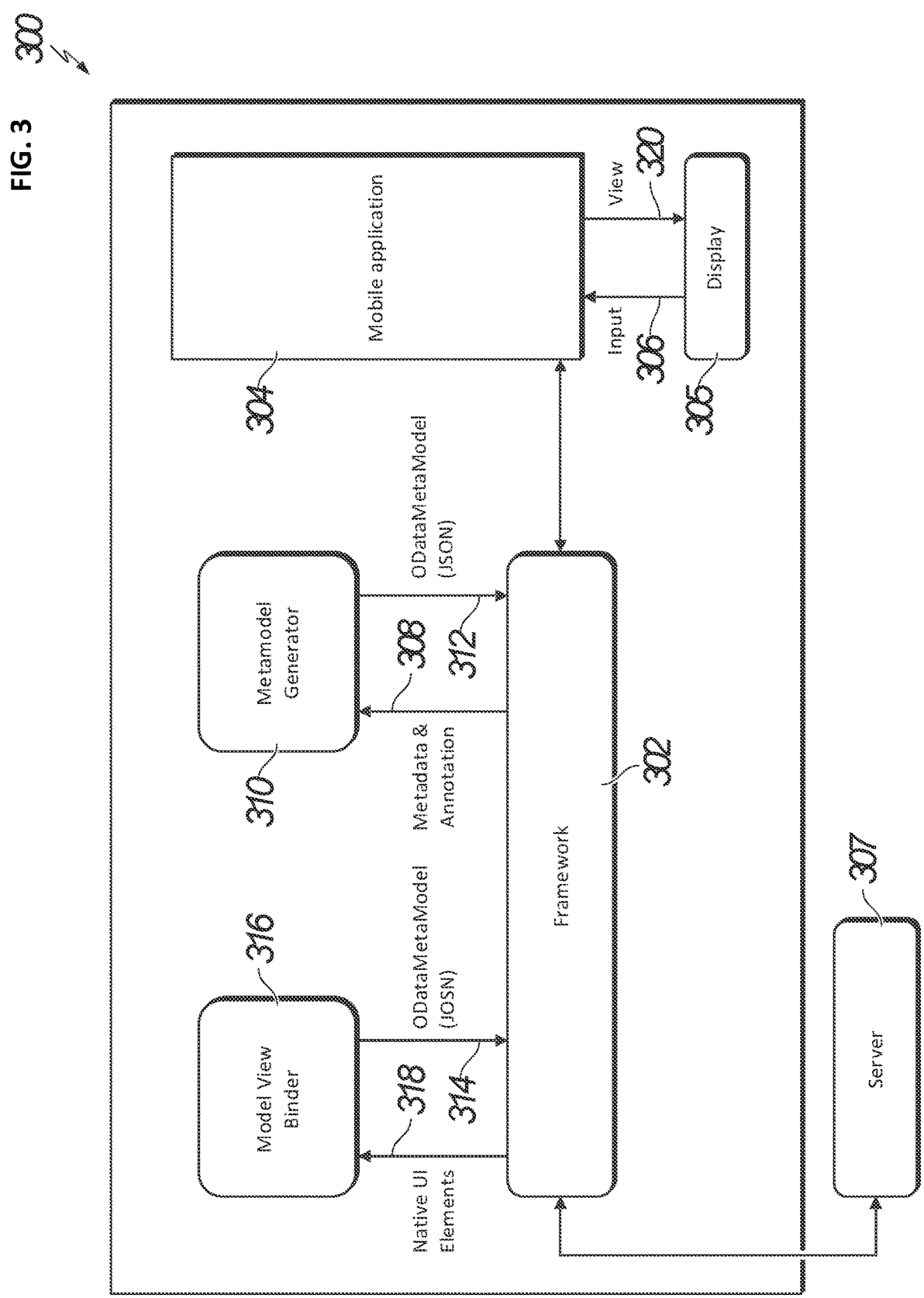
FIG. 3 is a block diagram of an example client-side system for view generation.

FIG. 3 is a block diagram of an example client-side system 300 for view generation. A mobile device 301 includes a framework 302 (which can be the framework 202 of FIG. 2). A mobile application 304 requests generation of a view to be displayed in the mobile application 304, on a display 305. The mobile application 304 can request view generation based on a user input 306, for example. In response to the request, the framework 302 obtains metadata and annotations for the view, e.g., from a server 307. The framework 302 sends metadata and annotations 308 to a metamodel generator 310. The metamodel generator 310 can include the metamodel generation components 201 that are described above in FIG. 2. The metamodel generator 310 can be the scripting component 214 of FIG. 2. The metamodel generator 310 generates a metamodel 312 using the metadata and annotations 308, and provides the metamodel 312 to the framework 302. The framework 302 sends the metamodel 312, as a forwarded metamodel 314, to a model view binder 316. The model view binder 316 maps information in the metamodel 314 to native user interface element types, and generates native user interface elements 318. The framework 302 creates a native view 320 using the native user interface elements 318, for presentation, on the display 305, in the mobile application 304.

Rather than having views be created on a client device based on metadata and annotations received from a server, in some implementations, a server can provide a service that can generate a view based on metadata and annotations, and provide the generated view to a client device. A service provider may offer both client-side and server-side view generation approaches, with different pricing options for each. A server-side implementation may require more server resources than a client-side approach, and could thus cost more than the client-side option, for example. In addition to price considerations, application developers can decide whether server-side generation or client-side generation of views, based on annotations, is more appropriate for their application.

Figure 4:
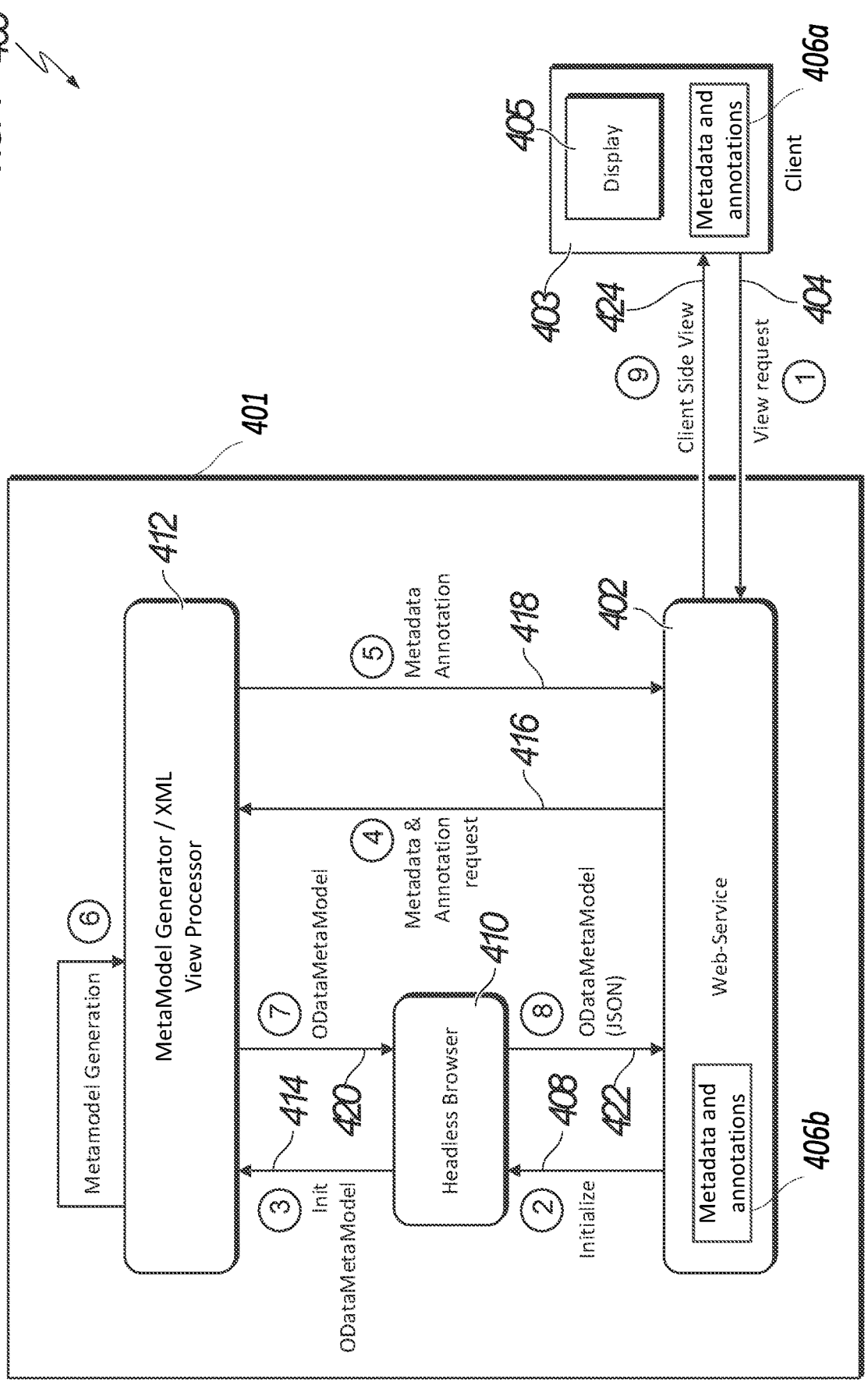
FIG. 4 is a block diagram of an example system for server-side view generation.

FIG. 4 is a block diagram of an example system 400 for server-side view generation. In some implementations, a server 401 provides a web service 402 for creating a view in response to a client request, as an alternative to client-side view generation. In a first stage, a client 403 can send a request 404 to the web service 402 for creation of a view. An application running on the client 403 may trigger an initial request for an initial view to be displayed on a display 405, or the application can receive a user input that triggers a request for a subsequent view to be displayed on the display 405. In some implementations, the request 404 includes metadata and annotations for the view. The client 403 may have previously received metadata and annotations 406a for the view from the server 401 or another server, for example. Upon receiving the request 404, the web service 402 can store received metadata and annotations 406b in the server 401. In some implementations, the request 404 includes URLs for annotations and metadata but does not include annotations and metadata. The web service 402 can retrieve metadata and annotations from another database or server, and store received metadata and annotations 406b.

In a second stage, the web service 402 can send a metamodel generation request 408 to a headless browser 410. A metamodel generator/XML view processor 412 can be running in (e.g., loaded in) the headless browser 410 and can receive a metamodel generation request 414, in a third stage. In a fourth stage, the metamodel generator/XML view processor 412 can send a metadata and annotation request 416 to the web service 402. When the request 404 includes annotations and metadata 406a, the web service 402 can retrieve the previously stored annotations and metadata 406b. When the request 404 includes URLs for annotations and metadata, the web service 402 can, using the URLs, request and receive annotations and metadata 406b from corresponding server(s) referenced by the URLs. In a fifth stage, the metamodel generator/XML view processor 412 can receive requested metadata and annotations 418 from the web service 402.

In a sixth stage, the metamodel generator/XML view processor 412 uses the metadata and annotations 418 to create a metamodel. In a seventh stage, the metamodel generator/XML view processor 412 sends a generated metamodel 420 to the headless browser 410. In an eighth stage, the headless browser 410 sends a metamodel 422 to the web service 402.

In a ninth stage, the web service 402 sends the metamodel to the client 402, for example, as a JSON response 424 that can be used by the client for a client-side view, for presentation in the display 405.

Figure 5A:
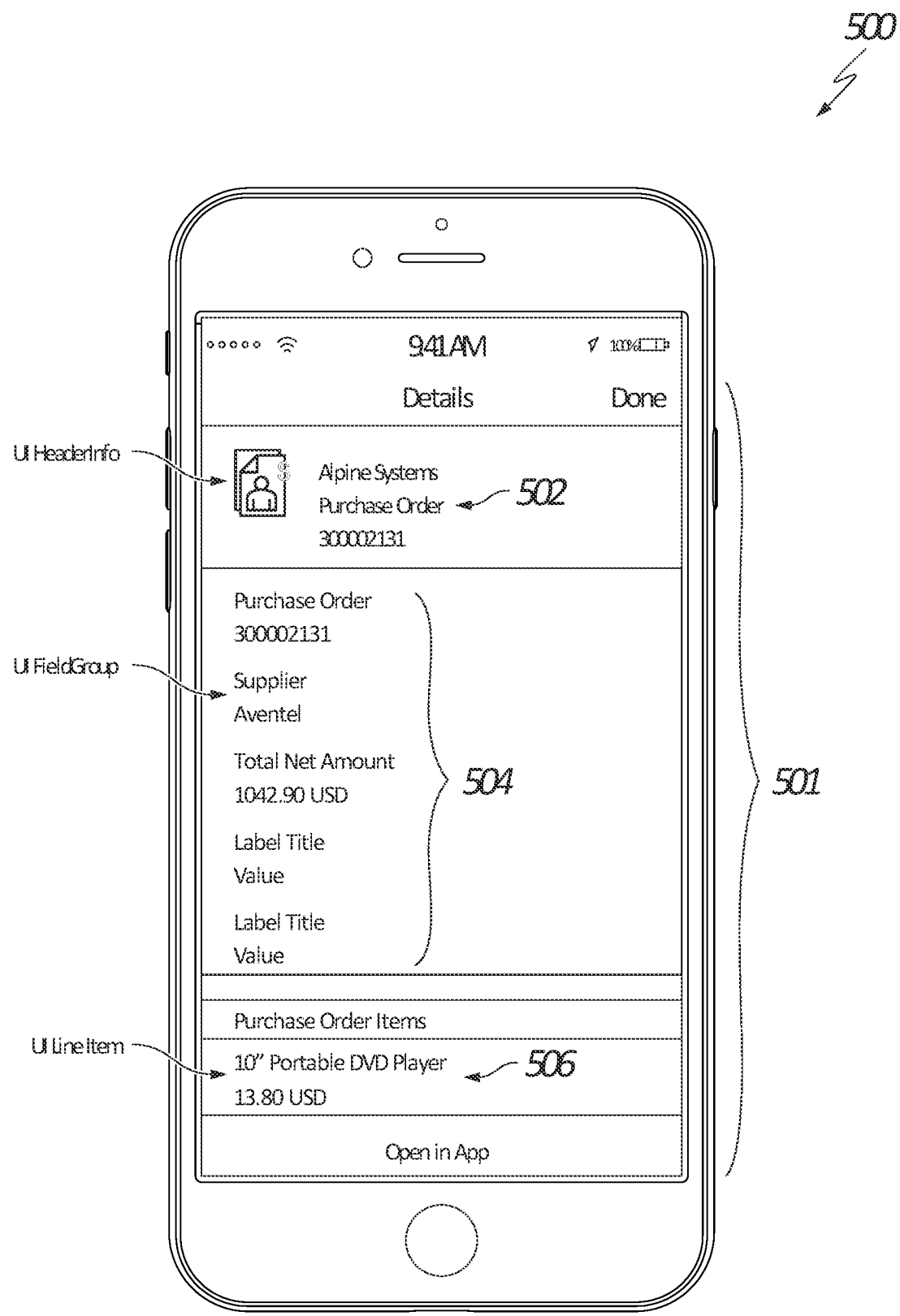
FIG. 5A illustrates an example view on a user device.

FIG. 5A illustrates an example view 501 on a user device 500. The view 501 is a form-based view that can show details of an object. For instance, the view 501 displays information for a purchase order object. The view includes a header section 502, a field-group section 504, and a list section 506. The structure of the view 501 can be defined using annotations. For example, the header section 502, the field-group section 504, and the list section 506 can be defined using a header information annotation, a field group annotation, and a line item annotation, respectively. The header information annotation.

Figure 5B:
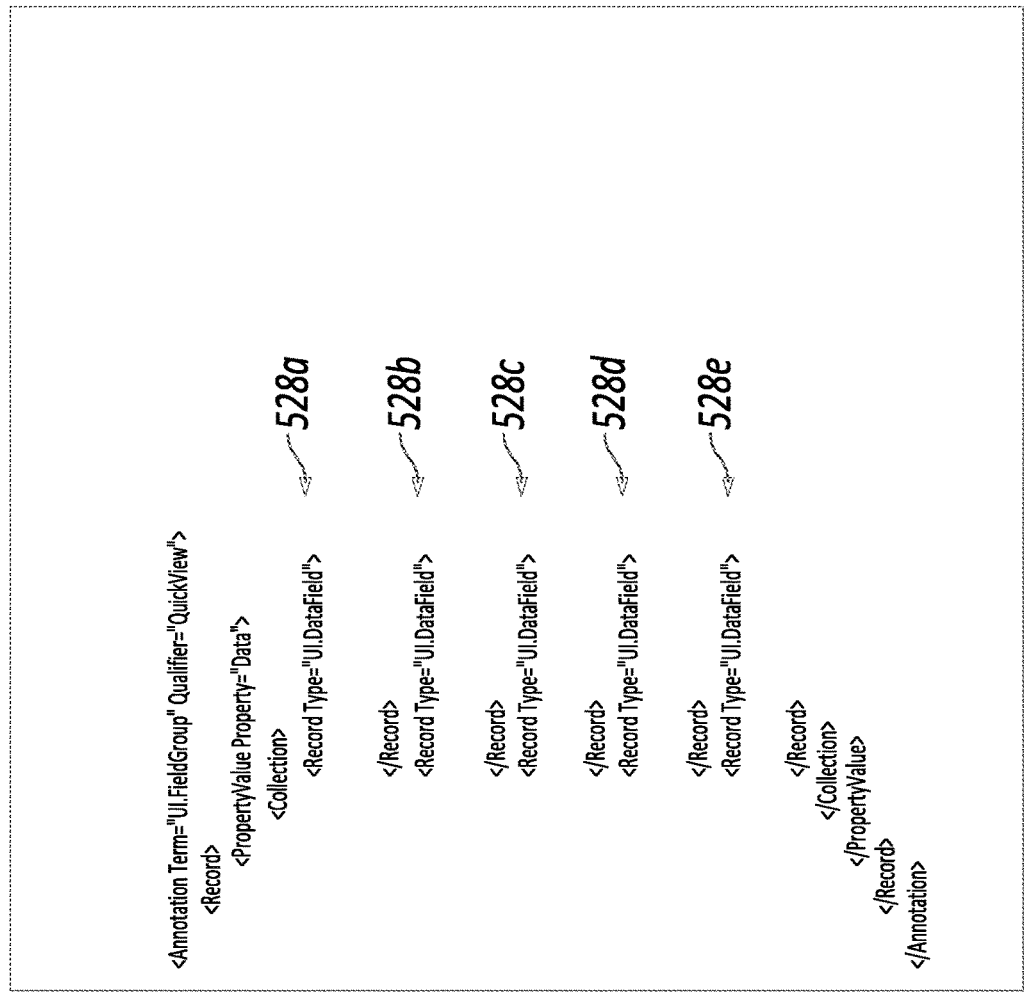
FIG. 5B illustrates an example view that is defined, in part, by example annotations.
Figure 5B:
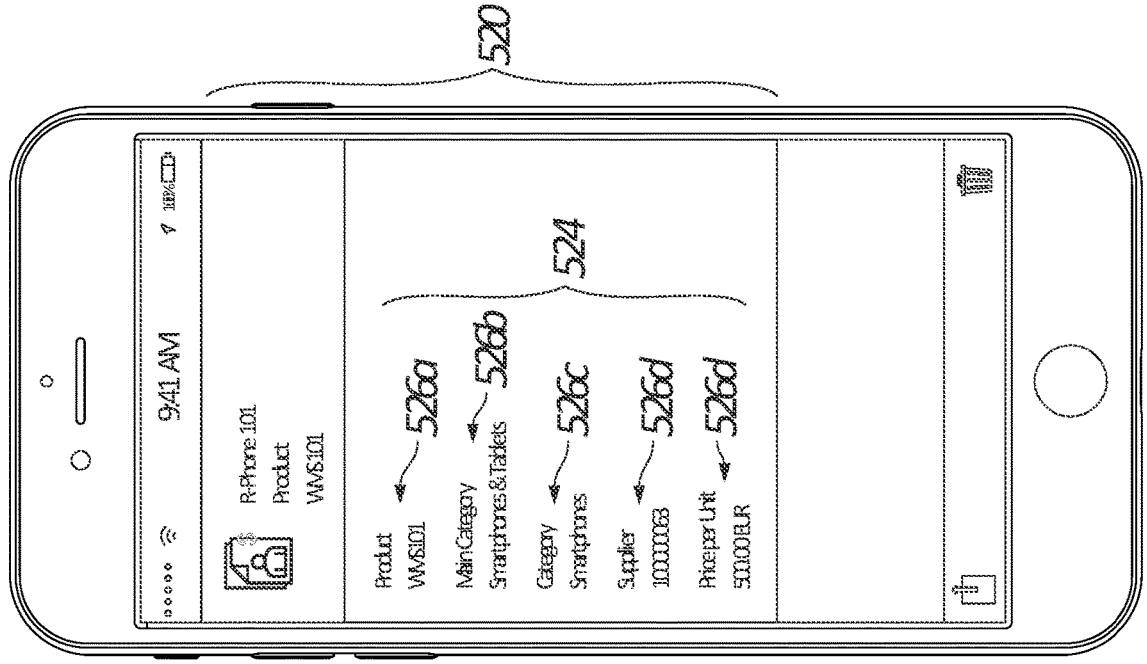

FIG. 5B illustrates an example view 520 that is defined, in part, by example annotations 522. A field group 524 includes product identifier 526a, main category 526b, category 526c, supplier 526d, and price-per-unit 526e fields. The fields in the field group 524 is defined by annotations 528a, 528b, 528c, 528d, and 528e, respectively. If a developer wishes to change the view 520, a change can be made to the annotations 522, and a next time the view 520 is to be loaded, the view 524 can be regenerated using modified annotations that have been received from a server. The view 524 can be reloaded due to user input or due to a notification from the server that annotations have changed.

A developer may wish to change the view 520 so that the category field 526c is no longer displayed (e.g., the developer may decide that having both the main category field 526b and the category field 526c is unnecessary).

Figure 5C:
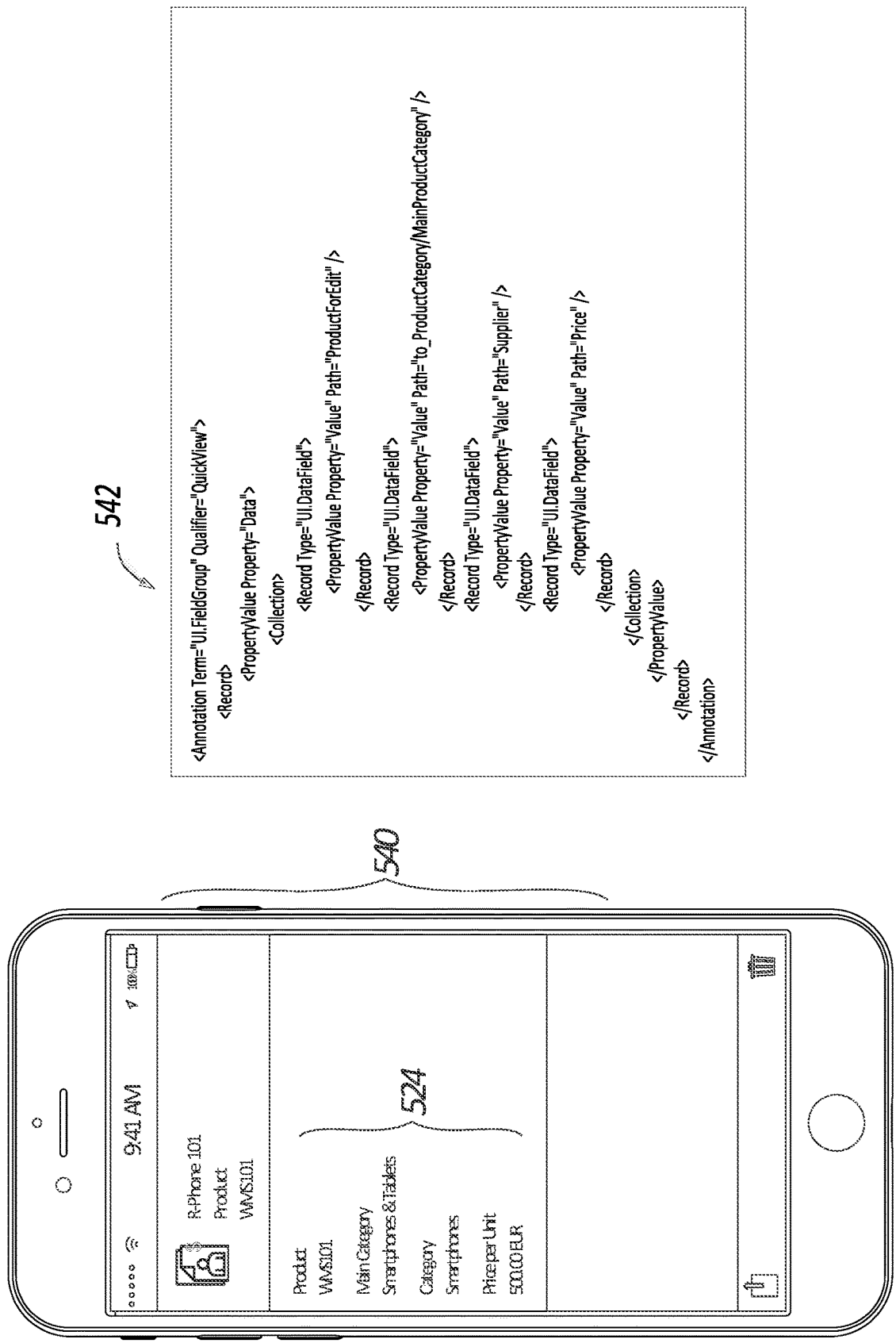
FIG. 5C illustrates an updated view automatically generated from updated annotations.

FIG. 5C illustrates an updated view 540 automatically generated from updated annotations 542. The updated view 540, as compared to the view 520, no longer has the category field 526c. Correspondingly, the updated annotations 542, as compared to the annotations 520, no longer include an annotation for a category field. The updated view 540, when regenerated, is regenerated based on the updated annotations 542. A framework can intelligently determine whether updated annotations (and/or updated metadata) have been received. If annotations and metadata for a view haven't changed since a metamodel was last generated for the view, a previously-generated view can be displayed (or, some implementations, a view can be regenerated based on a last-used metamodel (e.g., without generating a new metamodel)).

Figure 5D:
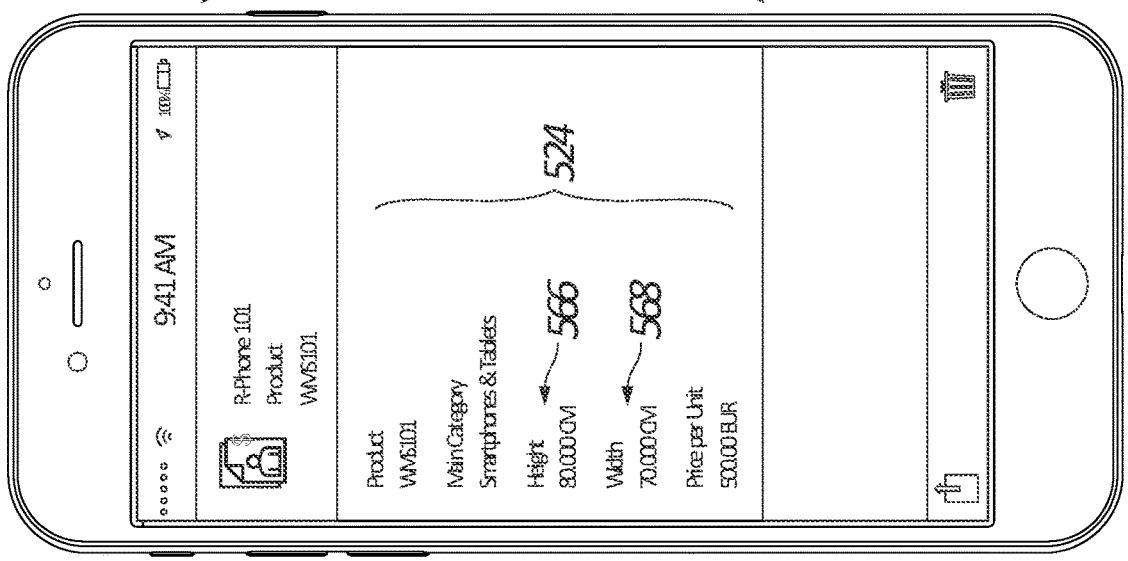
FIG. 5D illustrates an updated view automatically generated from updated annotations.

FIG. 5D illustrates an updated view 560 automatically generated from updated annotations 562. The updated view 560, as compared to the view 540, has a new product height field 566 and a new product width field 568. Correspondingly, the updated annotations 562, as compared to the annotations 540, include a new height field annotation 570 and a new width field 572. The updated view 560, when regenerated, is regenerated based on the updated annotations 562.

Figure 5E:
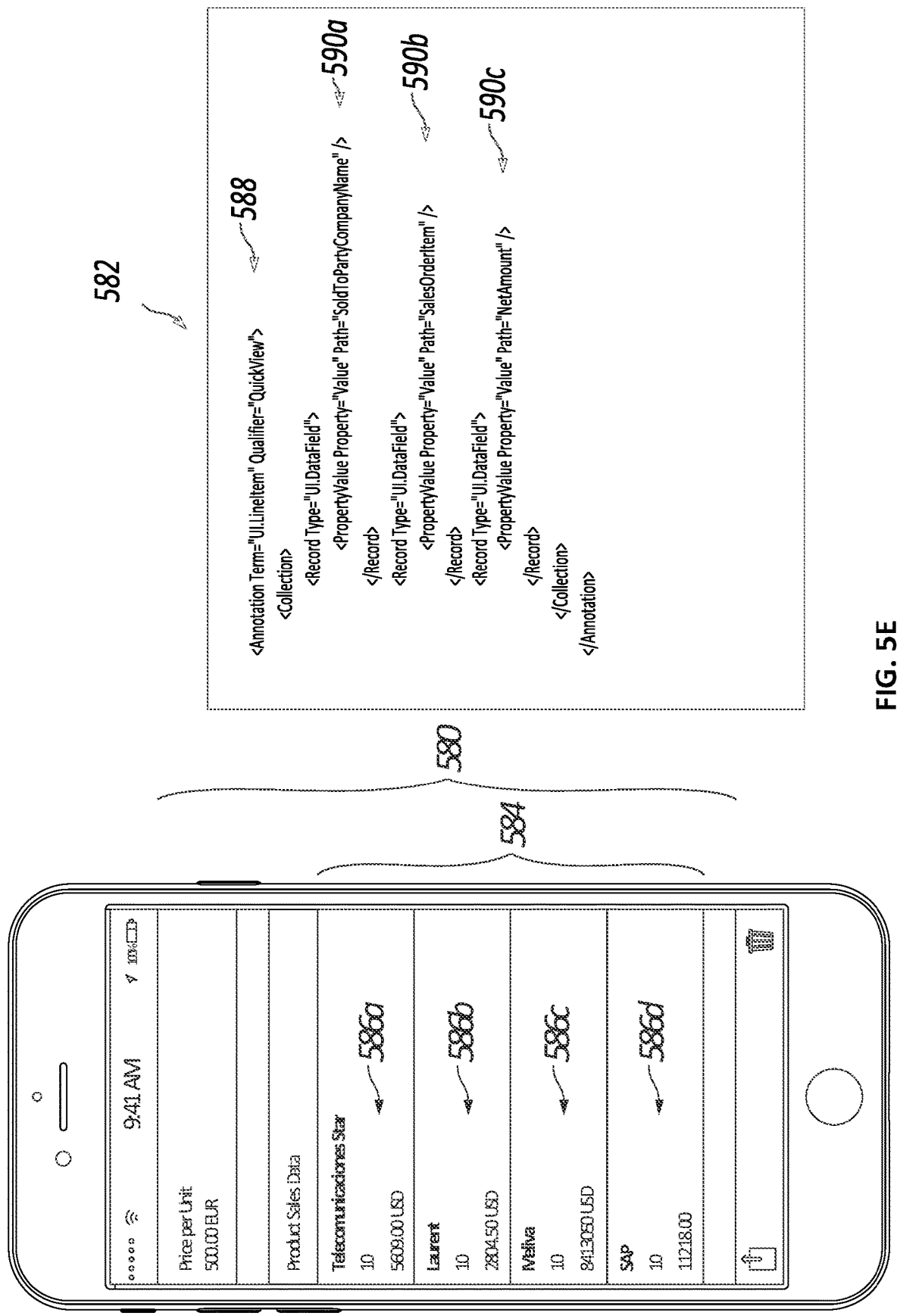
FIG. 5E illustrates an updated view automatically generated from updated annotations.

FIG. 5E illustrates an updated view 580 automatically generated from updated annotations that include new annotations 582. The updated view 580 has a table 584 (which in some implementations is referred to as a list), which includes multiple entries 586a, 586b, 586c, and 586d (e.g., one entry per order in an orders entity). Each entry has multiple items (e.g., a sold to party name, an ordered item number, and an order net amount). The table 584 is included in the updated view 580 based on the new annotations 582. The new annotations 582 include a line item annotation 588 that includes a sold-to party name data field 590a, an ordered item data field 590b, and a net amount data field 590c. The updated view 580, when regenerated, is regenerated based on the new annotations 582.

Figure 6:
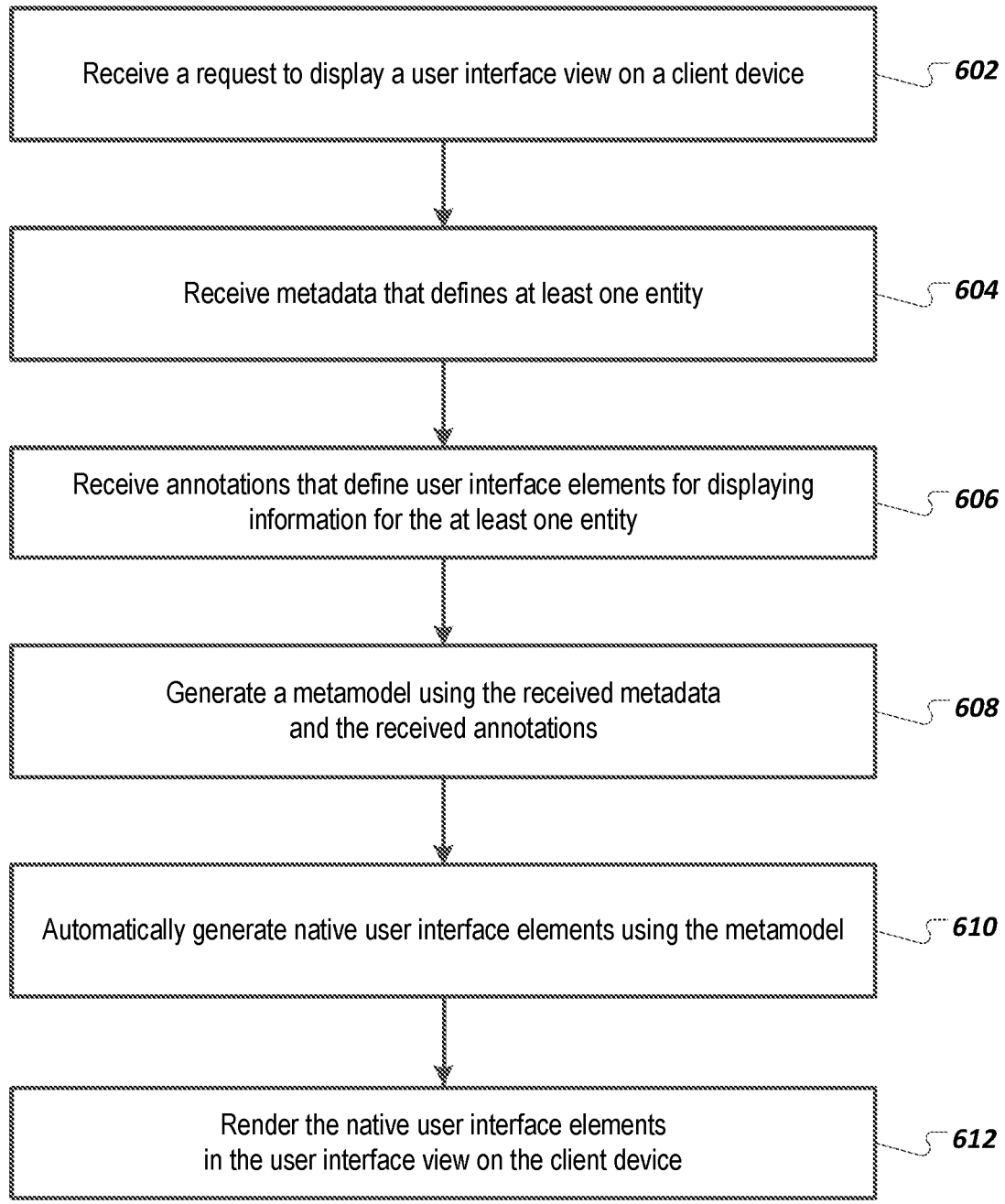
FIG. 6 is a flowchart of an example method for automatic view generation based on annotations.

FIG. 6 is a flowchart of an example method 600 for automatic view generation based on annotations. It will be understood that method 600 and related methods may be performed, for example, by any suitable system, environment, software, and hardware, or a combination of systems, environments, software, and hardware, as appropriate. For example, one or more of a client, a server, or other computing device can be used to execute method 600 and related methods and obtain any data from the memory of a client, the server, or the other computing device. In some implementations, the method 600 and related methods are executed by one or more components of the system 100 described above with respect to FIG. 1. For example, the method 600 and related methods can be executed by the framework 118 of FIG. 1.

At 602, a request to display a user interface view on a client device is received.

At 604, metadata that defines at least one entity included in at least one data source is received.

At 606, annotations that define first user interface elements for displaying information for the at least one entity are received.

At 608, a metamodel is generated using the received metadata and the received first annotations. The metamodel merges the metadata and the annotations. The metamodel can be generated using a scripting engine. The scripting engine can be on the client device or on a server.

At 610, native user interface elements are automatically generated using the metamodel. The native user interface elements are native to the client device. The native user interface elements can be generated by mapping, for each of the native user interface elements, a metamodel user interface type with a corresponding native user interface type.

At 612, the native user interface elements are rendered in the user interface view on the client device. Property values can be requested for the at least one entity for displaying in the native user interface elements. The property values can be received (e.g., from the at least one data source) and displayed in the native user interface elements in the user interface view.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving a first request to display a user interface view on a client device;
receiving first metadata that defines at least one entity included in at least one data source;
receiving first annotations that define first user interface elements for displaying information for the at least one entity;
generating a first metamodel using the received first metadata and the received first annotations;
storing the first metamodel on the client device as a stored metamodel;

automatically generating first native user interface elements using the first metamodel, wherein the first native user interface elements are native to the client device;

rendering the first native user interface elements in the user interface view on the client device;

receiving a second request to display the user interface view on the client device, the second request received after receipt of the first request;

receiving second metadata;

receiving second annotations; and in response to determining that the second metadata matches the first metadata and that the second annotations match the first annotations:

retrieving the stored metamodel without generating a second metamodel;

automatically generating second native user interface elements using the stored metamodel, wherein the second native user interface elements are native to the client device; and rendering the second native user interface elements in the user interface view on the client device.

2. The method of claim 1, further comprising:

receiving a second request to display the user interface view on the client device;

receiving second metadata;

receiving second annotations, wherein the second annotations are different from the first annotations and define second user interface elements that have at least one difference from the first user interface elements;

generating a second metamodel using the received second metadata and the received second annotations;

automatically generating second native user interface elements using the second metamodel, wherein the second native user interface elements are native to the client device; and rendering the second native user interface elements in the user interface view on the client device.

3. The method of claim 2, wherein the second metadata is different than the first metadata.

4. The method of claim 3, further comprising receiving property values for the at least one entity.

5. The method of claim 1, further comprising requesting property values for the at least one entity for displaying in the first native user interface elements.

6. The method of claim 1, further comprising displaying the received property values in the first native user interface elements in the user interface view.

7. The method of claim 1, wherein the metamodel is generated using a scripting engine.

8. The method of claim 1, wherein the metamodel is generated on the client device.

9. The method of claim 1, wherein the metamodel is generated on a server.

10. The method of claim 1, wherein generating the first native user interface elements comprises mapping, for each of the first native user interface elements, a metamodel user interface type with a corresponding native user interface type.

11. The computer implemented method of claim 1, further comprising, in response to determining that either the second metadata does not match the first metadata or the second annotations do not match the first annotations:

generating a second metamodel using the received second metadata and the received second annotations;

storing the second metamodel on the client device as a second stored metamodel;

automatically generating second native user interface elements using the second metamodel; and rendering the second native user interface elements in the user interface view on the client device.

12. A system comprising:

one or more computers; and a computer-readable medium coupled to the one or more computers having instructions stored thereon which, when executed by the one or more computers, cause the one or more computers to perform operations comprising:

receiving a first request to display a user interface view on a client device;

receiving first metadata that defines at least one entity included in at least one data source;

receiving first annotations that define first user interface elements for displaying information for the at least one entity;

generating a first metamodel using the received first metadata and the received first annotations;

storing the first metamodel on the client device as a stored metamodel;

automatically generating first native user interface elements using the first metamodel, wherein the first native user interface elements are native to the client device;

rendering the first native user interface elements in the user interface view on the client device;

receiving a second request to display the user interface view on the client device, the second request received after receipt of the first request;

receiving second metadata;

receiving second annotations; and in response to determining that the second metadata matches the first metadata and that the second annotations match the first annotations:

retrieving the stored metamodel without generating a second metamodel;

automatically generating second native user interface elements using the stored metamodel, wherein the second native user interface elements are native to the client device; and rendering the second native user interface elements in the user interface view on the client device.

13. The system of claim 12, wherein the metamodel is generated using a scripting engine.

14. The system of claim 12, wherein the metamodel is generated on the client device.

15. The system of claim 12, wherein the metamodel is generated on a server.

16. The system of claim 12, wherein generating the first native user interface elements comprises mapping, for each of the first native user interface elements, a metamodel user interface type with a corresponding native user interface type.

17. A computer program product encoded on a non-transitory storage medium, the product comprising non-transitory, computer readable instructions for causing one or more processors to perform operations comprising:

receiving a first request to display a user interface view on a client device;

receiving first metadata that defines at least one entity included in at least one data source;

receiving first annotations that define first user interface elements for displaying information for the at least one entity;

generating a first metamodel using the received first metadata and the received first annotations;

storing the first metamodel on the client device as a stored metamodel;

automatically generating first native user interface elements using the first metamodel, wherein the first native user interface elements are native to the client device;

rendering the first native user interface elements in the user interface view on the client device;

receiving a second request to display the user interface view on the client device, the second request received after receipt of the first request;

receiving second metadata;

receiving second annotations; and in response to determining that the second metadata matches the first metadata and that the second annotations match the first annotations:

retrieving the stored metamodel without generating a second metamodel;

automatically generating second native user interface elements using the stored metamodel, wherein the second native user interface elements are native to the client device; and rendering the second native user interface elements in the user interface view on the client device.

18. The computer program product of claim 17, wherein the metamodel is generated using a scripting engine.

19. The computer program product of claim 17, wherein the metamodel is generated on the client device.

20. The computer program product of claim 17, wherein the metamodel is generated on a server.

* * * * *